United States Patent
Michaelis et al.

(10) Patent No.: US 9,626,099 B2
(45) Date of Patent: Apr. 18, 2017

(54) MULTI-FINGER SLIDING DETECTION USING FINGERPRINTS TO GENERATE DIFFERENT EVENTS

(75) Inventors: Paul Roller Michaelis, Louisville, CO (US); Douglas M. Grover, Westminster, CO (US); David Mohler, Arvada, CO (US); Richard Robinson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 502 days.

(21) Appl. No.: 12/895,344

(22) Filed: Sep. 30, 2010

(65) Prior Publication Data

US 2012/0044156 A1 Feb. 23, 2012

Related U.S. Application Data

(60) Provisional application No. 61/375,341, filed on Aug. 20, 2010.

(51) Int. Cl.
*G06F 3/041* (2006.01)
*G06F 3/0488* (2013.01)
*G06F 3/0354* (2013.01)

(52) U.S. Cl.
CPC ...... *G06F 3/04883* (2013.01); *G06F 3/03547* (2013.01); *G06F 2203/0338* (2013.01); *G06F 2203/04808* (2013.01)

(58) Field of Classification Search
CPC .... G06F 3/0488; G06F 3/04883; G06F 3/044; G06F 3/04886; G06F 3/045; G06F 3/041;
(Continued)

(56) References Cited

U.S. PATENT DOCUMENTS 5,812,118 A 9/1998 Shieh
6,278,433 B2 8/2001 Narui
(Continued)

FOREIGN PATENT DOCUMENTS

EP 1717680 11/2006
EP 2226741 9/2010
(Continued)

OTHER PUBLICATIONS

UIST'09, Oct. 4-7, 2009, Victoria British Columbia, Canada; pp. 23-32; "Detecting and Leveraging Finger Orientation for Interaction with Direct-Touch Surfaces."*
(Continued)

*Primary Examiner* — Md Saiful A Siddiqui
(74) *Attorney, Agent, or Firm* — Sheridan Ross P.C.

(57) ABSTRACT

Fingerprint portions of two or more different fingers are detected on a detection surface, such as an optical surface, a touch pad, a touchscreen, or the like, and then a further detection made that the person has moved their finger(s), for example, apart, together or relative to one another. The movement can be detected based on identifying the fingerprint portion sliding across the screen. The combination of fingerprint information associated with a corresponding motion is correlatable to one or more actions or triggering events that are used to control one or more electronic devices. Further aspects are directed toward utilizing one or more of the techniques herein for a security application. For example, two users, each placing one or more fingers on a touch screen or touch pad, with the fingerprints thereafter being recognized, perform a certain movement with this triggering the unlocking, or locking, of an object.

19 Claims, 6 Drawing Sheets (58) Field of Classification Search
CPC ....... G06F 3/03547; G06F 2203/04808; G06F 2203/0338
USPC .................. 345/156, 173; 340/3.2; 382/124; 178/18.01–18.09
See application file for complete search history.

(56) References Cited

U.S. PATENT DOCUMENTS

| | | | | |
|---|---|---|---|---|
| 6,408,087 | B1* | 6/2002 | Kramer | 382/124 |
| 7,479,949 | B2 | 1/2009 | Jobs et al. | |
| 8,581,842 | B2 | 11/2013 | Grover et al. | |
| 2005/0134427 | A1 | 6/2005 | Hekimian | |
| 2006/0232567 | A1 | 10/2006 | Westerman et al. | |
| 2006/0284853 | A1 | 12/2006 | Shapiro | |
| 2007/0097096 | A1 | 5/2007 | Rosenberg | |
| 2007/0252821 | A1 | 11/2007 | Hollemans et al. | |
| 2008/0158170 | A1 | 7/2008 | Herz | |
| 2009/0125848 | A1 | 5/2009 | Keohane et al. | |
| 2009/0141952 | A1* | 6/2009 | Saito et al. | 382/124 |
| 2009/0289911 | A1* | 11/2009 | Nagai | 345/173 |
| 2009/0295720 | A1* | 12/2009 | Tseng et al. | 345/158 |
| 2009/0320106 | A1* | 12/2009 | Jones et al. | 726/5 |
| 2010/0225607 | A1* | 9/2010 | Kim | G06F 3/042 345/173 |
| 2010/0240415 | A1* | 9/2010 | Kim et al. | 455/565 |
| 2011/0006876 | A1* | 1/2011 | Moberg et al. | 340/3.2 |
| 2011/0157346 | A1* | 6/2011 | Zyzdryn et al. | 348/77 |
| 2011/0175804 | A1 | 7/2011 | Grover | |

FOREIGN PATENT DOCUMENTS

| | | |
|---|---|---|
| GB | 2477017 | 7/2011 |
| JP | 2008-123032 | 5/2008 |
| WO | WO 2009/013253 | 1/2009 |
| WO | WO 2010/134615 | 11/2010 |

OTHER PUBLICATIONS

Search Report for United Kingdom Patent Application No. GB1114299.9, dated Nov. 28, 2011 4 pages.
Westerman "Hand Tracking, Finger Identification, and Chordic Manipulation on a Multi-Touch Surface," Dissertation submitted to the Faculty of the University of Delaware in partial fulfillment of the requirements for the degree of Doctor of Philosophy in Electrical Engineering, Spring 1999, 363 pages.
Search Report for United Kingdom Patent Application No. 1114299.9, dated Jun. 22, 2012 2 pages.
Marsal, "Apple looks to take multi-touch beyond the touch-screen," AppleInsider, 2008, retrieved from <http://appleinsider.com/articles/08/09/04/apple_looks_to_take_multi_touch_beyond_the_touch_screen>, 8 pages.
Official Action for United Kingdom Patent Application No. GB1114299.9, dated Jan. 27, 2017, 6 pages.

* cited by examiner

MULTI-FINGER SLIDING DETECTION USING FINGERPRINTS TO GENERATE DIFFERENT EVENTS

CROSS REFERENCE TO RELATED APPLICATION

The present application claims the benefits of U.S. Provisional Application Ser. No. 61/375,341, filed Aug. 20, 2010, entitled "MULTI-FINGER SLIDING DETECTION USING FINGERPRINTS TO GENERATE DIFFERENT EVENTS", which is incorporated herein by this reference in its entirety.

FIELD

One exemplary aspect is directed toward input devices. Even more particularly, an exemplary aspect is directed toward a touchscreen or touchpad user interface.

BACKGROUND

A touchpad, which is also known as a track pad, is an input device that includes a special surface that is capable of translating the motion and position of a user's finger to a relative position on, for example, a screen or monitor. Touchpads are becoming even more abundant on laptop computers, and also can be used as a substitute for a computer mouse when, for example, there is limited space. Touchpads vary in size but are rarely made larger than 40 square cm with their size generally being proportional to the device which with they are associated. They can also be found on personal digital assistants (PDAs), portable media players, laptops, netbooks, and the like.

In general, touchpads operate either based on capacitive sensing and/or conductance sensing. The most common technology used entails sensing the capacitance of a finger, or the capacitance between sensors. Because of the property being sensed, capacitance-based touchpads will not sense the tip of a pencil or other similar implement. Gloved fingers will generally also be problematic, and may cause problems when a user is trying to operate the device.

Touchpads, similar to touchscreens, by their design, are able to sense absolute positions, with precision being limited by their size. For common use as a pointing device, the dragging motion of a finger is translated into a finer, relative motion of a cursor on a screen—analogous to the handling of a mouse that is lifted and put back on a surface. Buttons comparable to those present on a mouse are typically below, above, or beside the touchpad with the buttons serving in a similar manner to the buttons on a mouse. Depending on the model of the touchpad and drivers behind it, one may also be able to click by tapping your finger on the touchpad and a drag with tap followed by a continuous pointing motion (a click and a half). Touchpad drivers can also allow the use of multiple fingers to facilitate functionality corresponding to the other mouse buttons, commonly a two-finger tapping is correlatable to the center button of a mouse.

Some touchpads also have "hot spots" which are locations on the touchpad that facilitate user intentions other than pointing. For example, on certain touchpads, moving the finger along an edge of the touchpad will act as a scroll wheel, controlling the scroll bar and scrolling the window that has the focus vertically or horizontally depending on which edge is stroked. Some companies use two-finger dragging gestures for scrolling on their track pads, with these typically being driver dependent functions that can be enabled or disabled by a user. Some touchpads also include tap zones which are regions whereby a tap will execute a predetermined function. For example, the function could be pausing of the media player or launching of an application.

There are two principal technologies that are used in touchpads. In a matrix approach, a series of conductors are arranged in an array of parallel lines into layers, separated by an insulator and crossing each other at right angles to form a grid. A high frequency signal is applied sequentially between pairs of lines in this two-dimensional grid array. The current that passes between the nodes is proportional to the capacitance. When a virtual ground, such as a finger, is placed over one of the intersections between the conductive layer, some of the electric field is shunted to this virtual ground point, resulting in a change in the apparent capacitance at this location.

In the capacitive shunt method, the pad senses a changing capacitance between a transmitter and a receiver that are on opposite sides of the sensor. The transmitter creates an electric field which oscillates typically between 200 and 300 khz. If a ground point, such as finger, is placed between the transmitter and receiver, some of the field lines are shunted away, thereby decreasing the apparent capacitance. These changes in capacitance are then used as input from the device.

There are also touchpads that have advanced functionality, such as letting users scroll in an arbitrary direction by touching the pad with two fingers instead of one, and then moving their fingers across the pad in the direction they wish to scroll. Other enhanced functionality includes the ability to allow users to do various combinations of gestures, such as swiping four fingers up or down to activate a particular application.

A touchscreen is an electronic visual display that can detect the presence and location of a touch within the display area. The term generally refers to a touch or to a contact to the display of the device by a finger, fingers or a hand. Touchscreens can also sense other passive objects, such as a pen. In general, any screen that allows a user to interact physically with what is shown on the display, via direct manipulation, is typically categorized as a touchscreen.

Touchscreens typically have two main attributes. The first is that the touchscreen enables one to interact with what is displayed directly on the screen, where it is displayed, rather than indirectly with a mouse or a touchpad. Secondly, a touchscreen allows a user to interact with the display without requiring any intermediate device, again, such as a stylus, mouse, or the like, that would usually be held in the hand. These devices are often seen in tablet PCs, and are also prominent in many digital appliances such as PDAs, satellite navigation devices, mobile phones, mobile entertainment devices, smart phones, video games, and the like.

There are a number of technologies that support touchscreens, such as resistive technologies, surface acoustic wave technologies, capacitive technologies, surface capacitance technologies, projected capacitance technologies, strain gauge technologies, optical imaging technologies, dispersive signal technologies, acoustic pulse recognition technologies, and coded LCD (bi-directional screen) technologies.

SUMMARY

Typical graphical user interfaces (GUI) provide rich capabilities. For example, a mouse or track ball provides a user the capability to create multiple events such as right clicking, left clicking, scrolling (using a scroll wheel and the mouse), and the like. As the use of small portable devices proliferates, especially communications devices, the demand for similar capabilities in a touchscreen is desired.

Existing touchscreens can provide the ability to zoom in and zoom out based on a person moving two of their fingers apart while touching the touch screen. For example, one popular current smart phone has this type of capability. This is done using existing touch screen technology that can detect touch based on pressure, capacitance, and the like. These existing touch screen detection technologies cannot detect which fingers are being used and cannot generate different events based on which fingers are being used.

Today, touch screen technology has evolved to the point where the capability to imbed fingerprint detection in a touch screen is known. This technology is capitalized upon and is utilized as the basis for enhancing touch screen interaction.

In accordance with one exemplary aspect, fingerprint portions of two or more different fingers are detected on a detection surface, such as an optical surface, a touch pad, a touchscreen, or the like, and then a further detection made that the person has moved their fingers, for example, apart or together, on the surface. The sliding motion can be detected based on identifying the fingerprint portion sliding across the screen. In addition, other types of motion can be detected such as detecting one finger staying in a fixed area, and another finger sliding in a specific direction on the screen. Instead of zooming-in or zooming-out, the screen could roll in the direction of the only moving finger. This concept could be extended by registering fingerprint portions of specific fingers. Once the system knows the print portions, the system can now determine different events based on the user doing the same, or other, motions.

For example, if the user moves their thumb and index finger apart on the touch screen with their left hand, a first event could be triggered. If the person does the same motion with the index finger and thumb on the right hand, a second, different event, could be triggered. Other types of motions can be detected such as tapping in the same spot with the same finger, tapping in the same spot with different fingers, sliding and tapping, tapping and sliding, based on different print portions or the same print portions, events based on moving fingers in an opening "V" motion (based on different print portions), and the like.

Another exemplary option would be to use the techniques disclosed herein in cooperation with a drawing or similar program. For example, if a circle is drawn with the tip of a first finger, a line can be drawn in a first color. If the circle is drawn with the side or bottom of the same finger, as recognized due to a different fingerprint portion being recognized, a line can be drawn using a different color. The color could change as the same finger is moved from the tip of the finger to, for example, the bottom of the finger while drawing a line.

Another exemplary aspect is directed to the situation where a person drags an index finger and middle finger of their right hand down a screen or pad generating a first event. If the same person drags the index finger and middle finger of their left hand down the screen or pad a different event is generated. This can be extended to various combinations of fingers on different hands and optionally for different users.

Another exemplary aspect is directed to the situation where a person drags one finger up the screen and drags another finger down the screen or pad generating a first event. For example, the event may be to rotate the screen. If the same person uses a different combination of fingers to perform the same action, a different event is generated.

The idea could also be extended and combined to generate different events based on a person rolling their fingers outward while sliding their fingers apart to generate different events, which are different than when they just slid their fingers outward. As will be appreciated, this concept can also be used on a touch-pad of a mouse (e.g., the type typically used on a laptop computer), by detecting the movement of different fingers going apart or together creating different zoom-in and/or zoom-out events.

Additional exemplary aspects are directed toward recognizing fingerprints on a plurality of fingers and correlating motions of one or more of these plurality of fingers to a corresponding action(s) or event(s). In addition to detecting motion of the fingerprints on the touch pad, a time variable can be utilized to detect proximity of touches and/or the addition or removal of one or more fingerprints from the touch pad, with these actions triggering corresponding action(s) or event(s) being performed by the associated computing device. Even further aspects are directed toward a multi-user touch screen or touch pad where fingerprints are detected and correlated to a particular user, and then further correlated to trigger a particular action(s) or event(s).

Even further aspects are directed toward utilizing one or more of the techniques herein for a security application. For example, two users, each placing one or more fingers on a touch screen or touch pad, with the fingerprints thereafter being recognized, perform a certain movement with this triggering the unlocking, or locking, of a system or device. In this exemplary scenario, the actions can be correlated to an authorization event to control access.

One exemplary aspect is, therefore, directed to generating or triggering one or more events or actions based on the detection of multiple print portions (e.g., fingerprints) of a person's (or persons') fingers.

Even further aspects are directed toward correlating a motion of a plurality of detected fingerprints to one or more corresponding actions or events.

Even further aspects are directed toward utilizing the techniques disclosed herein in cooperation with one or more of touch screens, touch pads, or other touch-sensitive input devices, to control one or more actions or events thereon.

Even further aspects are directed toward detecting a relative motion of two or more fingerprints on an input device, and correlating the movement, in conjunction with the specific identified fingerprints, to one or more triggerable actions or events.

Even further aspects are directed toward a multi-user environment, where individuals' fingerprints are identified and those fingerprints tracked to capture a particular motion. This motion is then used as the triggering event for an action attributable to that particular user.

Even further aspects are directed toward recording custom actions based on the detection of a plurality of fingerprints, and a corresponding action performed by those fingerprints, such as sliding, rotating, rolling, an addition or removal of the one or more fingerprints within a certain time period, and in general, any movement of the one or more fingerprints either relative to the input device and/or one another.

Additional aspects are directed toward correlating a portion of a detected fingerprint to one or more actions or events.

Even further aspects are directed toward detection of a transition and mapping that transition to corresponding functionality(ies), the transition being one or more of:
    a rotation or degree of rotation about an axis;
    a point-of-contact staying at a same X/Y coordinate while
        a finger(s) rotates; and a point-of-contact shifting to a different X/Y coordinate while a finger(s) rotates.

Even further aspects are directed toward using one or more of the above techniques in conjunction with knowledge of anatomical limitations without detection of the underlying fingerprints. For example, the triggering of an action or event can be based on a detection of fingers from two different hands.

Additional aspects are directed toward identifying whether phalanges are from the same hand—independent of whether fingerprints are detected. Since these techniques do not rely on fingerprint detection—and, in fact, rely on a computationally less intensive ability to distinguish thumbs from the other fingers—what can be determined in some cases (not all) is whether a detected pattern is physically achievable with the phalanges of the same hand. The problem is, if it is determined that the detected pattern is from phalanges of the same hand, it is still possible that the pattern was achieved with two hands. For example, an index finger and a middle finger of the same hand, next to each other and flat on the screen, may be harder to distinguish from a right and left index fingers next to each other and flat on the screen. Thus, this determination can be useful and reliable for a determination, based on knowledge of human anatomy, that the detected pattern is not achievable when the phalanges are from the same hand.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any non-transitory, tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, this disclosure is considered to include a tangible storage medium or distribution medium and prior art-recognized equivalents and successor media, in which the software implementations of the present embodiments are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the embodiments are described in terms of exemplary embodiments, it should be appreciated that individual aspects of the embodiments can be separately claimed.

The preceding is a simplified summary of the embodiments to provide an understanding of some aspects of thereof. This summary is neither an extensive nor exhaustive overview of the various embodiments. It is intended neither to identify key or critical elements of the embodiments nor to delineate the scope of the embodiments but to present selected concepts of the embodiments in a simplified form as an introduction to the more detailed description presented below. As will be appreciated, other embodiments are possible utilizing, alone or in combination, one or more of the features set forth above or described in detail below.

BRIEF DESCRIPTION OF THE DRAWINGS

The exemplary embodiments disclosed herein will be discussed with relation to the figures wherein.

DETAILED DESCRIPTION

The techniques will be illustrated below in conjunction with an exemplary electronic system. Although well suited for use with, e.g., a system using a computer/electronic device, server(s), communications devices, and/or database(s), the embodiments are not limited to use with any particular type of electronic device(s) or system or configuration of system elements. Those skilled in the art will recognize that the disclosed techniques may be used in any application in which it is desirable to provide enhanced input capabilities.

The exemplary systems and methods will also be described in relation to software (such as drivers), modules, and associated hardware. However, to avoid unnecessarily obscuring the present disclosure, the following description omits well-known structures, components and devices that may be shown in block diagram form, are well known, or are otherwise summarized.

For purposes of explanation, numerous details are set forth in order to provide a thorough understanding of the embodiments. It should be appreciated, however, that the techniques disclosed herein may be practiced in a variety of ways beyond the specific details set forth herein.

As can be appreciated by one skilled in the art, although specific methods and techniques have been described for using detected input of contact portions of a finger on a touch-screen, touch pad, or the like, other known pattern recognition methods can be employed to determine inputs.

Figure 1:
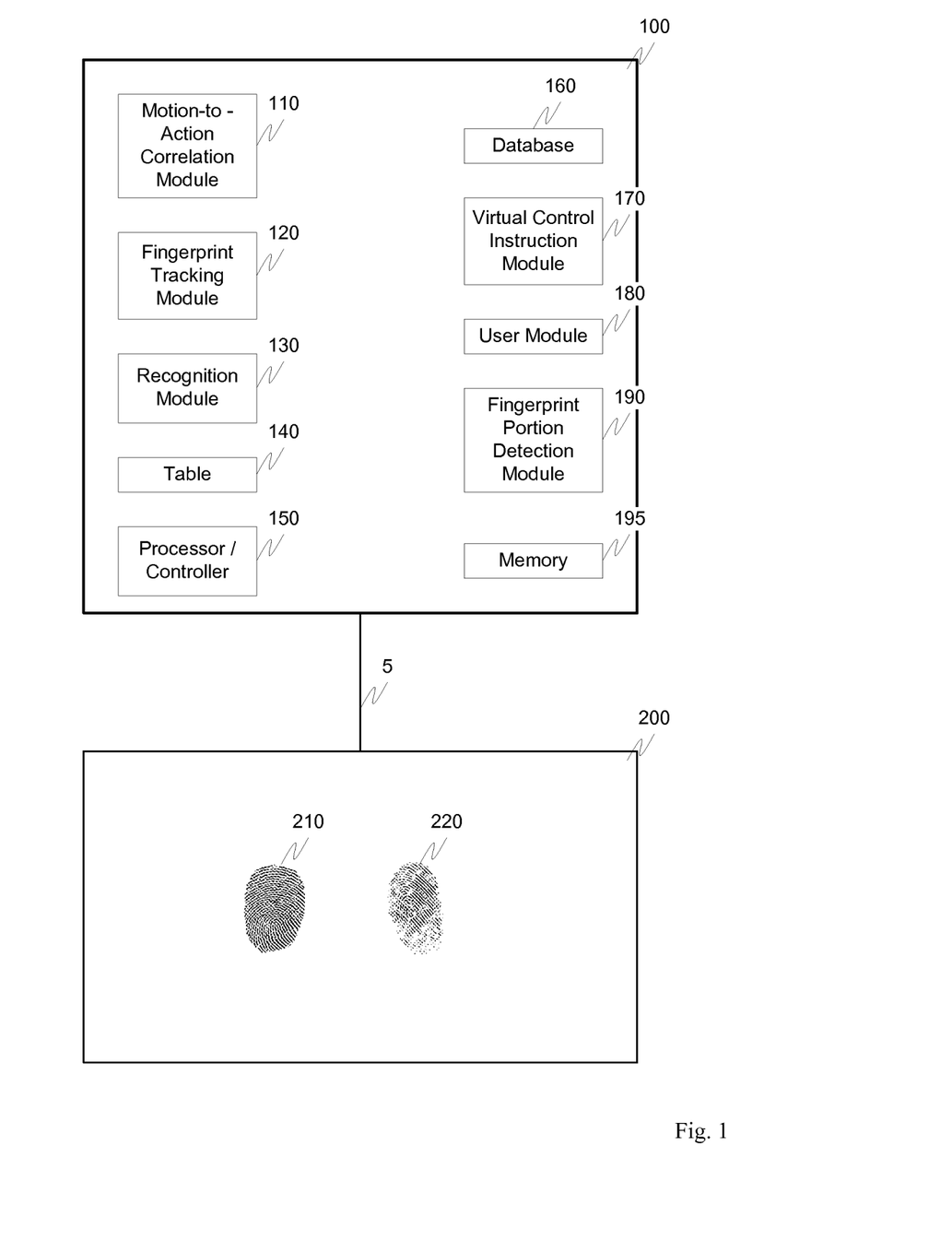
FIG. 1 is a block diagram illustrating an exemplary input control for an electronic device.

FIG. 1 illustrates an exemplary embodiment of an input device 100 that can be associated with an electronic device(s). While the embodiments discussed hereinafter will be directed toward the electronic device including a touch pad type of device, it is to be appreciated that the functionality and techniques disclosed herein can also be extended to touch screens, track pads, and related input devices that are in general capable of detecting and tracking motions of a body part, such as a finger. Moreover, hybrid devices, such as a mouse that includes a touchpad, can also utilize one or more of the techniques disclosed herein.

Additionally, the various embodiments disclosed herein will be discussed in relation to an input device 100 within an environment that typically includes other well known electronic componentry, such as a display, keyboard, etc., that are typically associated with an electronic device that includes an input interface.

Furthermore, while the various embodiments will be discussed in relation to fingerprints, it should be appreciated that the techniques can be extended to any body part or object on which a recognizable pattern can be detected.

The exemplary embodiment of FIG. 1 illustrates a sensing device, such as touch pad 200, connected via link 5 to an input device 100 which includes a motion-to-action correlation module 110, a fingerprint tracking module 120, a recognition module 130, table 140, processor/controller 150, database 160, virtual control instruction module 170, user module 180, fingerprint portion detection module 190 and memory 195. For ease of illustration, numerous known and conventional components have been omitted for the sake of clarity, but it is to be appreciated that the input device as depicted in FIG. 1 can be associated with, for example, a personal computer, PDA, smart phone, gaming device, mobile electronics device, laptop, net book, media player, point-of-sale equipment, and in general with any electronic device(s).

As discussed, the exemplary embodiments are directed toward increased functionality associated with detection of fingerprints on a plurality of fingers and generating or triggering one or more corresponding actions or events. For example, in FIG. 1, fingers 210 and 220 placed on touchpad 200 are used to control input to an associated device. In addition to being able to move the fingers 210 and 220 in the traditional X and Y directions on the touchpad 200, and in accordance with an exemplary embodiment, the fingers and corresponding fingerprints 210 and 220 can "rotate forward" about the X-axis thereby bringing the fingertip, and as the finger 110 continues to roll forward, a different portion of the fingerprint into contact with the touchpad 200. As will be discussed in greater detail hereinafter, certain functionality can be associated with different portions of the fingerprint that are detectable on the touchpad 200.

Furthermore, as will be appreciated, one or more fingers can be moved about the Y-axis, the Z-axis, and/or the X-axis, as well as removed from the touchpad 200, all of which, alone or in combination, can be correlated to triggering a corresponding action(s) or event(s). Additionally, combinations of X, Y, and Z motion may also have meaning similar to what they have with a joystick beyond discreet X, Y and Z motions, wherein the fingers can be used as a virtual joystick. Additionally, in another operational mode, a distinction can be made between a finger rotation in which the point-of-contact of the fingerprint on the touch pad does not change (with or without the fingerprint contact portion changing), i.e., the point-of-contact stays at the same X/Y coordinate while the finger(s) rotate—and the case in which the point-of-contact shifts during the finger rotation. These different interactions could similarly be mapped to corresponding functionality, event(s) or action(s).

In operation, the input device 100 in FIG. 1 is connected to the touchpad 200, on which a plurality of fingerprints, such as fingerprints 210 and 220, are detected. The recognition module 130 with the cooperation of one or more of processor 150 and database 160, then performs a look-up to determine which fingerprint(s) has been detected. As will be discussed hereinafter in greater detail, to initialize the system, the user can introduce the fingers (or portions of fingers) with which they want to use to control the system, with the system being able to detect the fingerprint (or portion of fingerprint) on the one or more introduced fingers and store this information in database 160 and/or table 140. In addition to recording a traditional fingerprint, the system can also record a portion of a fingerprint associated with a portion of a finger such as a fingertip, a side of the finger, side of the thumb, or the like. In general, any detectable body portion that has a corresponding ridge flow is detectable and storable by the system, with this detectable portion being able to be used in cooperation with recognition module 130, fingerprint portion detection module 190 and fingerprint tracking module 120 to correlate the input to one or more associated action(s) or event(s). While some of the remaining discussion will focus on the detection of fingerprints, it is to be understood that the techniques can be extended to include portions of fingerprints or other print portions.

Upon detection of the fingerprint, the recognition module 130 forwards this information to the motion-to-action correlation module 110 that can optionally be combined with information from the fingerprint tracking module 120 to determine the action which the user wants to perform. As will be appreciated, the simple placement of a plurality of fingers and detection of the corresponding fingerprints in itself can be used to trigger a corresponding action. Moreover, and as discussed above, the fingerprints 210 and 220 need not necessarily move on the touchpad 200, but their position could remain static, and the detection of one or more of the fingers leaving the touch pad 200, and then being reintroduced within a certain time period triggering an event(s) or action(s).

The presence of fingerprints on the touchpad 200 can also be combined, with the cooperative of the fingerprint tracking module 120, with a detected motion of the fingerprint(s) on the touchpad 200. As discussed, the detected motion can be in any one or more of the X, Y, and Z directions, as well as be the detected motion of a plurality of fingerprints in unison, or the detected motion of one or more of the fingerprints individually. For example, fingerprint 210 could rotate in a clockwise direction, while fingerprint 220 rotated in a counter-clockwise direction. The recognition module 130, knowing that fingerprint 220 corresponds to the index finger of the left hand, and fingerprint 220 corresponds to the index finger of the right hand, in cooperation with the fingerprint tracking module 120 detecting the respective clockwise and counter-clockwise rotations of each, can forward this information to the motion-to-action correlation module 110 that correlates that particular movement of specific fingerprints to a corresponding action with the cooperation of one or more of table 140 and database 160. For example, one or more of table 140 and database 160 can include information, such as a look-up table, with a list of movements of one or more fingerprints that have a corresponding triggerable action.

These techniques can of course be extended to recognition of portions of a fingerprint, such as the fingerprint portion that corresponds to the tip of finger, the side of the finger, or in general any portion of the finger.

Figure 2:
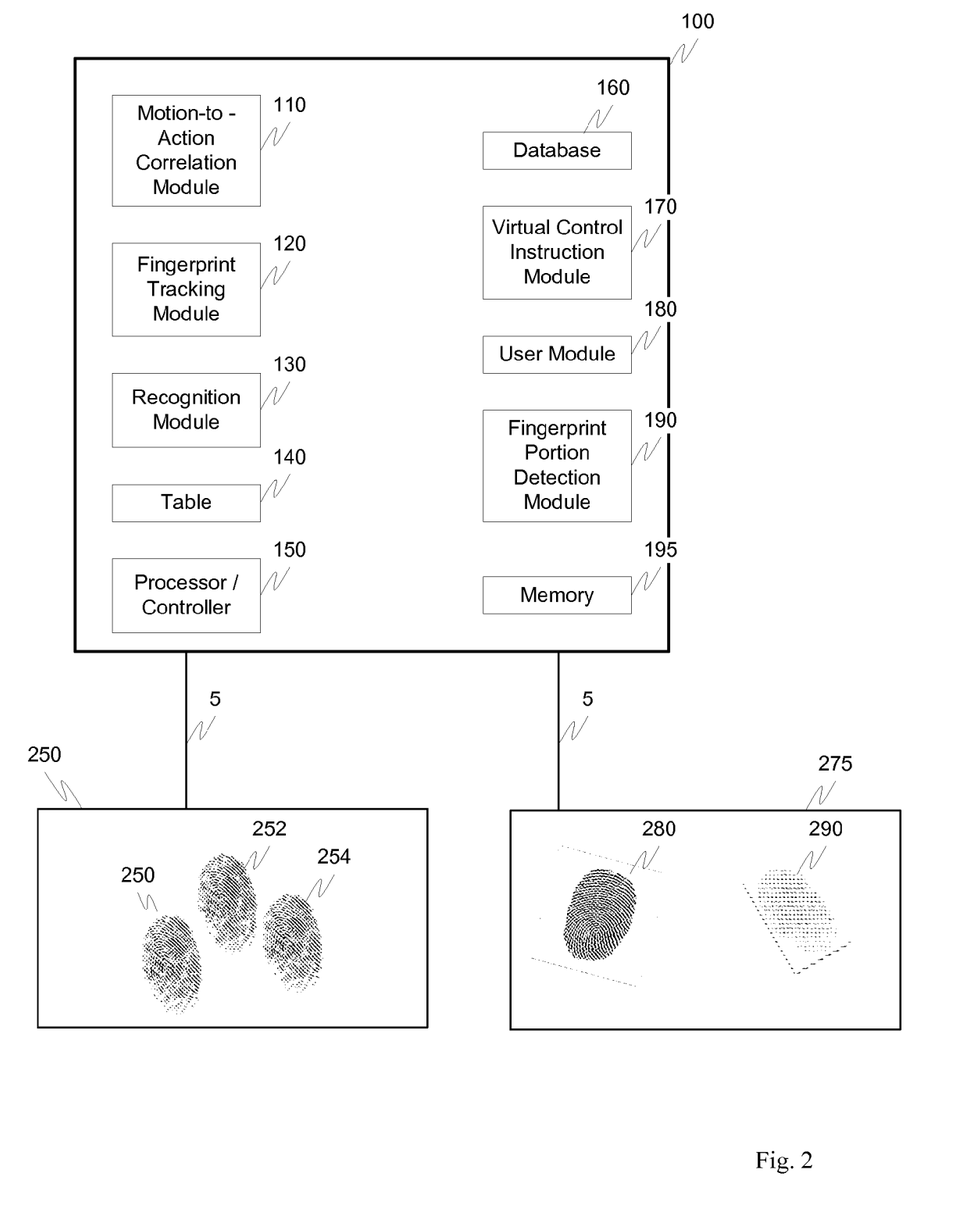
FIG. 2 is a block diagram illustrating another exemplary input control for an electronic device.

FIG. 2 outlines another exemplary embodiment of an input device that includes two touch pads 250 and 275. In this embodiment, like functionality is attributable to like modules and components as discussed above in relation to FIG. 1. As illustrated in FIG. 2, the input control module 100 is connectable to two touch pads 250 and 275, that are each capable of recognizing fingerprints in a manner similar to that discussed in relation to FIG. 1. However, in this embodiment, and with the cooperation of the user module 180, the system is further able to distinguish fingerprints of different users as well as equipped with the capability of recognizing input on two separate devices, such as devices 250 and 275, from the same user.

In accordance with a first embodiment, where each touchpad 250 and 275 is respectively associated with a particular user, the recognition module 130 detects and recognizes the fingerprints of the users with the cooperation of the user module 180. For example, fingerprints 250, 252 and 254 can be detected as the index, center and ring finger of a first user, while fingerprints 280 and 290 are the left and right, respectively, index fingers of a second user. As discussed, the fingerprint tracking module 120 is then capable of tracking a motion of the fingers and/or removal of or re-contact with one of the touchpad's, with this information being forwarded to the motion-to-action correlation module 110 that looks up in one or more of table 140 and database 160, an action(s) or event(s) associated with the detected events. This correlation performed by the motion-to-action correlation module 110, optionally in cooperation with one or more of processor 150 and memory 195, can correlate one or more of user-specific motions to user-specific actions, based on movement of the fingerprints and/or portions thereof, as well as correlate a combination of users' motions to specific action(s) or event(s) based on movement of the fingerprints and/or portions thereof. Upon determining the action that corresponds to the detected movement of the fingerprints, a trigger to execute the action(s) can be initiated.

Figure 3:
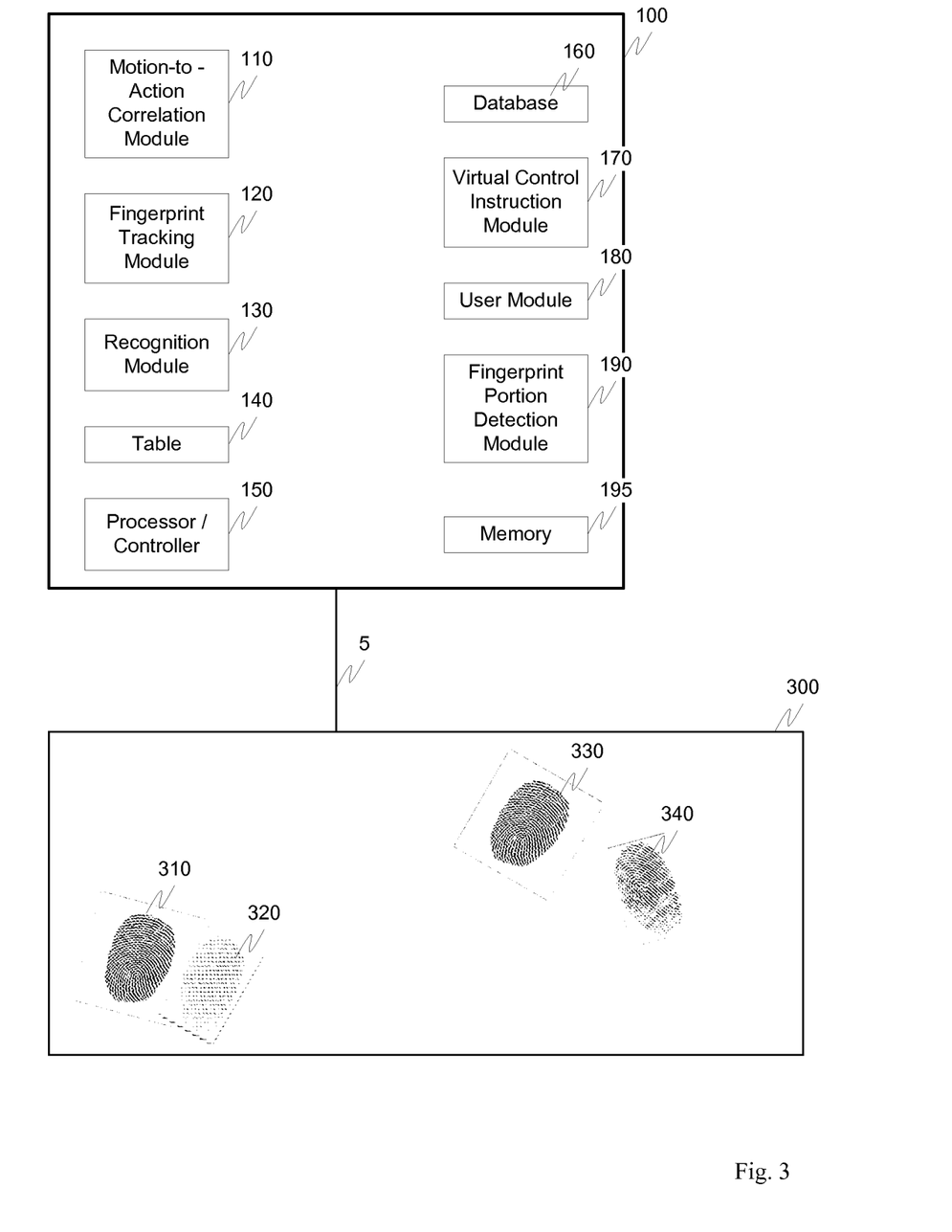
FIG. 3 is a block diagram illustrating yet another exemplary input control for an electronic device.

FIG. 3 illustrates another exemplary embodiment, where like function is attributable to like components, where a plurality of users utilize a single touch pad 300. The operation of the embodiment illustrated in FIG. 3 is comparable to that of FIG. 2, with the one difference being two or more users are in contact with touch pad 300.

One interesting aspect of this embodiment is the ability of the system to be used as authentication for access to a secure object. For example, a certain sequence of touching and/or moving of fingers of one or more specific users can be equated to a "key sequence" that is used to lock and/or unlock the object. For example, user one, with fingerprints 310 and 320, places their fingers in the lower left portion of touch pad 300, with user two placing their left hand index finger 330 and right hand index finger 340 on the upper right hand portion of touch pad 300, followed by user one sliding both their fingers in the upward direction, with user two sliding their fingers in the downward direction. In cooperation with the recognition module 130, fingerprint tracking module 120, user module 180, motion-to-action correlation module 110 as well as table 140 and/or database 160, this user information and finger movement is correlated to an authentication event that can be used to grant access to a secure object.

As with the other embodiments, fingerprint tracking module 120 is capable of detecting not only motion of the fingerprints, but also whether a fingerprint leaves and then returns to the touch pad 300, and/or whether a fingerprint leaves and another fingerprint, from the same (or different) user, returns to the touchpad 300 within a given time frame. Moreover, and as previously discussed, the fingerprint portion detection module 190 is capable of determining a portion of a fingerprint of a user, with this portion similarly being correlatable based on the detection thereof by the recognition module 130 and fingerprint portion detection module 190 to a corresponding action(s) or event(s) stored in one or more of table 140 and database 160.

Furthermore, and similar to the embodiment discussed in relation to FIG. 2, the user module 180 is capable of cooperating with the recognition module 130 and the motion-to-action correlation module 110 to insure that a "motion" input from a particular user is correlatable to one or more actions associated with that user. An example of this is in a gaming environment where each user is controlling a character during game play, with the system insuring that the user with a first set of recognized fingerprints is controlling their character within the game, and a user with a second set of recognized fingerprints is controlling the second user's character within the game.

The virtual control instruction module 170 is capable of assisting the system in building the necessary information that allows the motion-to-action correlation module 110 to correlate a particular motion, or sequence of motions, from a specific fingerprint(s) to a desired action(s) or event(s). As will be appreciated, this can be user-specific, and can be customizable by a user to suit a particular user's needs.

For example, upon initialization of a system that includes the disclosed modules, a user, with the cooperation of the virtual control instruction module 170, can be provided with a sequence of steps to be performed to allow the system to "learn" the fingerprints of the user and in general optionally detect how the user interacts with the touch pad.

In addition to being able to record customizable actions, in a manner similar to recording macros, the virtual control instruction module 170 can also be utilized to "train" a user for using virtualized controls. As will be discussed hereinafter in relation to FIG. 6, the virtual control instruction module 170 can display on a display (not shown) a virtualized control, such as a knob, slider, or in general any control-type apparatus and provide instructions to the user as to how to control this virtual control. This can be optionally accompanied by recommendations on finger placements relative to the virtual control along with guidance recommending how the user place their fingers on a touch pad for best detectability. Moreover, instructions can be provided to instruct the user, for example, "pretend" you were turning knob 602 with your fingers placed in the approximate positions shown on the touch pad. Then, in cooperation with the fingerprint tracking module 120 and recognition module 130 (optionally with fingerprint portion detection module 190), the motion of the fingers (when the user places fingerprints 602 and 602 on the touchpad, are tracked along with the recognition module 130 recording the actual fingers used for the motion, by analyzing and recording the fingerprint associated therewith. This information can then be stored, for example in database 160, with an indication that this particular motion, using these fingers, triggers an action to "turn up the volume."

Figure 4:
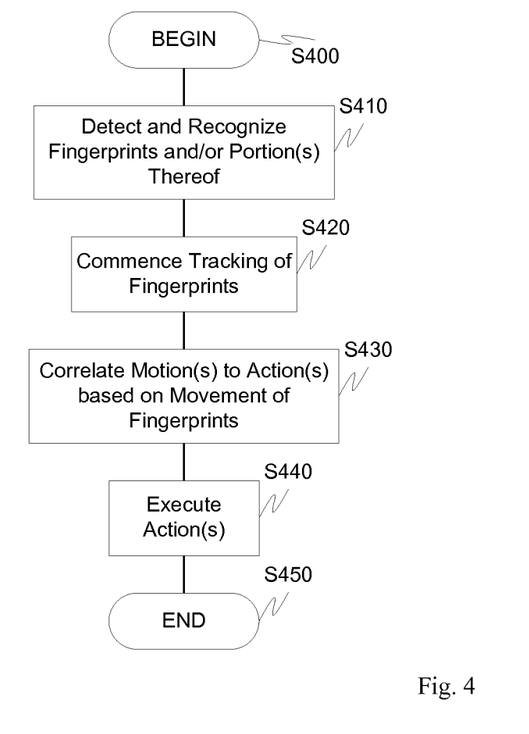
FIG. 4 is a flowchart outlining an exemplary method for operating a multi-finger input device.

FIG. 4 is a flowchart outlining an exemplary method of operation of an input device. In particular, control begins in step S400 and continues to step S410. In step S410, the plurality of fingerprints, and/or portions thereof, are detected with the fingerprints being recognized. Next, in step S420, tracking of motion of the fingerprints can optionally commence. As will be appreciated, and as discussed above, the simple presence of a plurality of fingerprints, optionally associated with the removal and re-introduction of the same or other fingerprints, can also be used to trigger a corresponding action, and the techniques disclosed herein are not limited to actual movement of the fingerprints, either as a whole, or relative to one another, in one or more of the X, Y, and Z directions, to trigger a corresponding action(s) or event(s). Then, in step S430, the combination of the recognized fingerprints, and motions thereof, are correlated to one or more actions. Control then continues to step S440.

In step S440, the one or more actions or events are executed with control continuing to step S450 where the control sequence ends.

Figure 5:
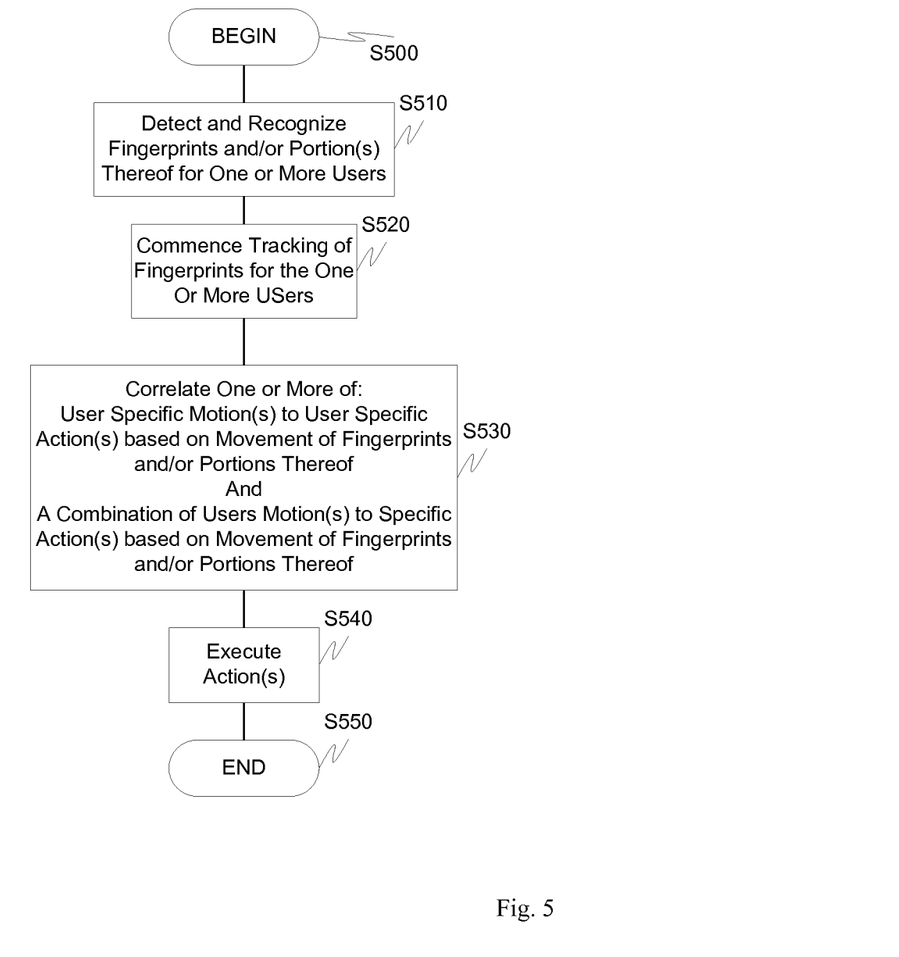
FIG. 5 is a flowchart outlining another exemplary method for operating a multi-finger input device.

FIG. 5 is a flowchart outlining another exemplary technique of operation of the input device 100. In particular, control begins in step S500 and continues to step S510. In step S510, one or more (optionally two or more) fingerprints and/or portions thereof are detected, with the fingerprints and/or portions thereof being recognized as belonging to one or more users. Next, in step S520, tracking of the motions of the fingerprints of the one or more users commences. Then, in step S530, the system correlates one or more of: user-specific motion(s) to user-specific action(s) or event(s) based on movement of fingerprints and/or portions thereof, as well as correlates a combination of users' motion(s) to specific action(s) or event(s) based on movement of the fingerprints and/or portions thereof. Control then continues to step S540.

In step S540, one or more actions or events are executed with control continuing to step S550 where the control sequence ends.

Figure 6:
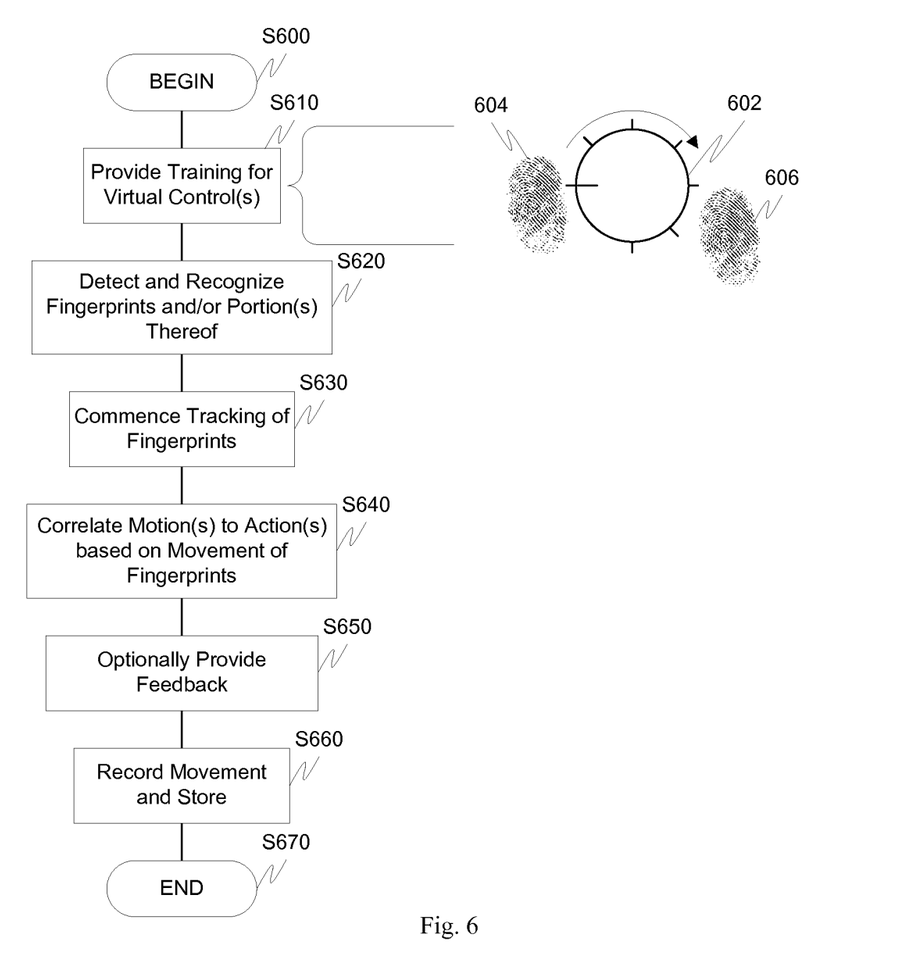
FIG. 6 is a flowchart outlining another exemplary method for operating a multi-finger input device.

FIG. 6 is a flowchart outlining another exemplary method of operation of the input device. In particular, control begins in step S600 and continues to step S610. In step S610, training can be provided to one or more users for one or more virtual controls and building a database for actions or functions associated with particular finger movements. As discussed, one or more of instructions, diagrams, and feedback can be provided to a user to allow the system to collect the necessary information to be able to correlate a plurality of fingerprints, or portions thereof, and optionally corresponding movement to a triggerable action(s).

For example, virtual control, such as knob 602, can be shown on a display with an illustration of optimum finger placement for control of the knob. The user can place their fingers (fingerprints 604 and 606) on a touchpad that, when rotated in a clockwise direction, increase a volume associated with knob 602.

Next, in step S620, and upon a user desiring to record an action to execute the triggerable action, the user places a plurality of fingers on the touch pad, with the fingers being detected and corresponding fingerprints recognized. As discussed, the system can recognize an entirety of the fingerprint, or a portion of a fingerprint corresponding to a particular portion of a finger in contact with the touch pad. Then, in step S630, the system can commence tracking of movement of the one or more fingerprints on the touchpad, and any one or more of the X, Y, and Z directions, and can optionally detect the removal of a fingerprint, or the addition of a fingerprint, and the timing of these actions relative to one another. Control then continues to step S640.

In step S640, the combination of the detected motion and recognized fingerprints is used and correlated to one or more actions or events based thereon. Next, in step S650, feedback can optionally be provided to the user such as, for example, whether a particular action was triggered based on their input. The user can then be asked as to whether the action is what was expected, or whether the detection was incorrect and whether or not the user would like to record the action, or not. If the detected action is what the user expected, this can be recorded and stored in step S660 for future use by the motion-to-action correlation module 110. Control then continues to step S670 where the control sequence ends.

In accordance with another exemplary embodiment, the use of detected ridgeflows can be used to assist in determining a rolling of a finger(s) in a particular direction(s). For example, if a user places their index finger flat on the touchpad, and then rotates their finger forward to the tip, there is a corresponding change in the detectable ridgeflows. This transition from the first ridgeflow of the flat index finger to a second ridgeflow associated with the finger tip, can be used as a motion to trigger one or more actions or events. Therefore, in accordance with one embodiment, the user can record the ridgeflows associated with multiple portions of the same finger, with these being used as discussed above, alone or in combination with X or Y direction movement, to trigger an action or event.

In accordance with another exemplary embodiment, knowledge of human skeletal structure and/or anatomy can be used with any of the above-described techniques to make inferences about whether the detected touch pattern was achieved with a single hand. For example, the detection of a thumb print and finger print side-by-side would be an immediate indication that the thumb and finger are not on the same hand, since it is not possible to have the thumb and the finger from the same hand touching each other with both prints also touching the screen. However, as you move your thumb and finger apart, one or both could then rotate so that the prints are touching the screen. With the knowledge of the anatomical limitations of motion, some preliminary analysis could be performed that could be used to, for example, reduce computational complexity in determining which fingers are present on the touchpad. For example, the detection of the print(s) could occur at any time during the movement of the fingers—i.e., not just at the start or end of the touching. Additionally, or alternatively, when a finger and thumb are involved, even with the same pair's X-Y coordinate movements, a rotation so that the thumb print is detected could trigger one event, with a rotation so that the finger print is detected could trigger a different event. Alternatively, or in addition, given that detection of a thumb print and a finger print side-by-side could be an immediate indication to the device that the thumb and finger could not be on the same hand, this could trigger a specific event even if there is no movement of the fingers.

Another option is not requiring the finger to be in contact with the touchpad in order to have the print be detected. For example, an optical technique could be utilized to detect the full (or larger portion of) the print even if it is only the side or top of the finger that is in contact with the touchpad. This could this be leveraged to add another dimension to the input control—e.g., same motion with same fingers, with prints touching the screen, being distinguishable from (and triggering a different action) the same motion with the same fingers, with fingertips touching the screen instead of prints.

By leveraging these anatomical and skeletal limitations, the system can function in a fingerprint agnostic manner. For example, and as discussed above, detection of a thumb and a finger print side-by-side could be used by the system to immediately determine that the fingers associated with the prints are not be on the same hand—thereby triggering a corresponding action without the need to actually detect the fingerprints. Thus, the rules governing the correlation of motions to actions could also include information accommodating this type of analysis.

As another example of how anatomical and skeletal structure can be utilized, fingers on the same hand move away from each other in an arc-type of motion (e.g., based on a logical pivot point in the palm). If fingers are detected as moving directly away from each other, in a straight line or reverse arc, anatomic knowledge can be used to surmise that the fingers must be on different hands. If the fingers are moving away from each other in an arc-type motion, it is likely that the fingers are on the same hand. Similarly, anatomical knowledge of the human body as a whole can be considered. For example, if two fingers are generally pointing toward each other, based on human physiology and the relationship of the shoulders, elbows and wrists, it could be assumed the fingers are on different hands.

As another example where fingerprints need not necessarily be detected, if a thumb and finger are touching, anatomic limitations dictate that the fingers are probably on the same hand. Using knowledge of the general shapes, proportions, relative proportions and/or shape(s) of fingers and thumbs, quick, less computationally intensive analyses can be performed to assist with the determination as to whether finger(s)/thumbs are present on the touchpad. This can eliminate the need to perform a full (or any) analysis of the fingerprints and still allow triggering activities to be based off the detection. In addition, the technique can optionally be performed capacitively and/or inductively instead of optically as may be necessary for full fingerprint detection.

While the above-described flowcharts have been discussed in relation to a particular sequence of events, it should be appreciated that changes to this sequence can occur without materially effecting the operation of the embodiments. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols herein can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems described herein is dependent on the speed and/or efficiency requirements of the system, the particular function, and the particular software or hardware systems or microprocessor or microcomputer systems being utilized. The security systems, methods and protocols illustrated herein can be readily implemented in hardware and/or software using any known or later developed systems or structures, devices and/or software by those of ordinary skill in the applicable art from the functional description provided herein and with a general basic knowledge of the computer and security arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods described herein can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided systems, apparatuses and methods for detecting input(s) to an electronic device. While the embodiments have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A method, comprising:
  detecting, by a microprocessor, a first touch and a simultaneous second touch on an electronic device;
  determining, by the microprocessor, a first finger with which the first touch is associated and a second finger with which the second touch is associated;
  detecting, by the microprocessor, a pattern of motion of the first touch and the second touch;
  determining, by the microprocessor and based on the detected pattern of motion, whether the detected pattern of motion corresponding to the first touch and the second touch is not physically achievable with fingers of a same hand; and
  allowing or denying, by the microprocessor, a function of the electronic device based on the determining whether the detected pattern of motion corresponding to the first touch and the second touch is not physically achievable with fingers of the same hand.

2. The method of claim 1, wherein the detected pattern of motion corresponding to the first touch and the second touch is determined to be not physically achievable with fingers of the same hand, and further comprising detecting, by the microprocessor, a plurality of fingerprints associated with a plurality of users based on the determining that the detected pattern of motion is not physically achievable with fingers of the same hand.

3. The method of claim 1, further comprising tracking, by the microprocessor, an additional motion of the first touch and correlating a first action of the additional motion to a first user.

4. The method of claim 1, wherein the first touch is a portion of a first identified fingerprint and the second touch is a portion of a second identified fingerprint.

5. The method of claim 4, wherein the first and second identified fingerprints have an identified orientation, and the determining whether the detected pattern of motion is not physically achievable is further based on the identified orientation.

6. The method of claim 1, further comprising providing, by the microprocessor, instructions to a user to assist with recording the motion of the first touch and the second touch to trigger the action.

7. The method of claim 1, wherein the function is an action of the electronic device that is correlated with the detected pattern of motion.

8. The method of claim 1, further comprising tracking, by the microprocessor, a motion of at least one of the first touch and the second touch, wherein the tracking includes an introduction or removal of the first touch or the second touch from a touchpad or touchscreen within a certain time period from the detecting the first touch.

9. The method of claim 1, further comprising detecting, by the microprocessor, a plurality of fingerprints associated with a plurality of users based on the determining whether the detected pattern of motion is not physically achievable, wherein the determining whether the detected pattern of motion is not physically achievable is further based on human anatomy and determines that the first finger and the second finger belong to the same hand.

10. The method of claim 1, further comprising detecting, by the microprocessor, a plurality of fingerprints associated with a plurality of users based on the determining whether the detected pattern of motion is not physically achievable, wherein the determining whether the detected pattern of motion is not physically achievable is further based on human anatomy and determines that the first finger and the second finger are on different hands.

11. An electronic device, comprising:
a sensing device; and
a microprocessor coupled to the sensing device, said microprocessor programmed to:
detect a first touch from the sensing device;
determine a first finger with which the first touch is associated;
detect a second touch from the sensing device;
determine a second finger with which the second touch is associated;
detect a pattern of motion of the first touch and the second touch;
correlate the detected pattern of motion to an action for controlling the electronic device; and
determine, based on the detected pattern of motion, whether the detected pattern of motion corresponding to the first touch and the second touch is not physically achievable with fingers of a same hand.

12. The electronic device of claim 11, wherein the microprocessor is further programmed to detect and identify a plurality of fingerprints associated with a plurality of users.

13. The electronic device of claim 12, wherein a first action is correlated to a first user and a second action is correlated to a second user based on detecting and identifying fingerprints of the first and second user, respectively.

14. The electronic device of claim 11, wherein the first touch is a portion of a first identified fingerprint and the second touch is a portion of a second identified fingerprint.

15. The electronic device of claim 14, wherein the first and second identified fingerprints have an identified orientation, and the determining whether the detected pattern of motion is not physically achievable is further based on the identified orientation.

16. The electronic device of claim 11, wherein the microprocessor is further programmed to provide instructions to a user to assist with recording the motion of the first touch and the second touch to trigger the action.

17. The electronic device of claim 11, wherein the action is used to allow or deny a function of the electronic device.

18. The electronic device of claim 11, wherein the microprocessor is further programmed to provide access to an object based on the action.

19. A method, comprising:
detecting, by a microprocessor, a first touch placed on an input device of an electronic device and a second touch placed on the input device;
determining, by the microprocessor, a first finger with which the first touch is associated and a second finger with which the second touch is associated;
detecting, by the microprocessor, a pattern of motion of the first touch and the second touch;
determining, by the microprocessor and based on the detected pattern of motion, whether the detected pattern of motion corresponding to the first touch and the second touch is not physically achievable with fingers of a common hand;
triggering, by the microprocessor, an action using the finger determination and based on the determination of whether the detected pattern of motion is not physically achievable; and
triggering a different action if the detected pattern of motion is physically achievable.

* * * * *